(No Model.)

J. D. MOSKOWITZ.
BICYCLE.

No. 472,796. Patented Apr. 12, 1892.

WITNESSES
Carroll J. Webster.
Grace E. Lehaney.

INVENTOR
Jacob D. Moskowitz
By
William Webster
Atty.

UNITED STATES PATENT OFFICE.

JACOB D. MOSKOWITZ, OF TOLEDO, OHIO, ASSIGNOR OF ONE-FOURTH TO SAMUEL J. BRAUN, OF SAME PLACE.

BICYCLE.

SPECIFICATION forming part of Letters Patent No. 472,796, dated April 12, 1892.

Application filed September 21, 1891. Serial No. 406,305. (No model.)

*To all whom it may concern:*

Be it known that I, JACOB D. MOSKOWITZ, of Toledo, county of Lucas, and State of Ohio, have invented certain new and useful Improvements in Bicycles; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to bicycles, and has especial relation to an improvement in the class known as "Safety" bicycles.

The object of the invention is to transmit the power from the crank-axle to the rear wheel by means of a plurality of sprocket wheels and chains, whereby the rider is enabled to attain a high rate of speed at an ordinary revolution of the crank-axle, thereby dispensing with the necessity of the rapid movement and extra exertion required to attain the same speed in the present form of bicycles.

A further object is to locate the driving mechanism with relation to the frame so that it will not interfere with the movement of the rider.

With these objects in view the invention consists, broadly, in gearing from the crank-axle to a multiplying-gear located above the rear wheel and from the multiplying-gear to the rear wheel by means of multiplying-gears in vertical alignment therewith, whereby the normal revolution of the crank-axle will multiply the speed of the driving-wheel.

The invention further consists in the parts and combination of parts hereinafter described, and pointed out in the claim.

Figure 1:
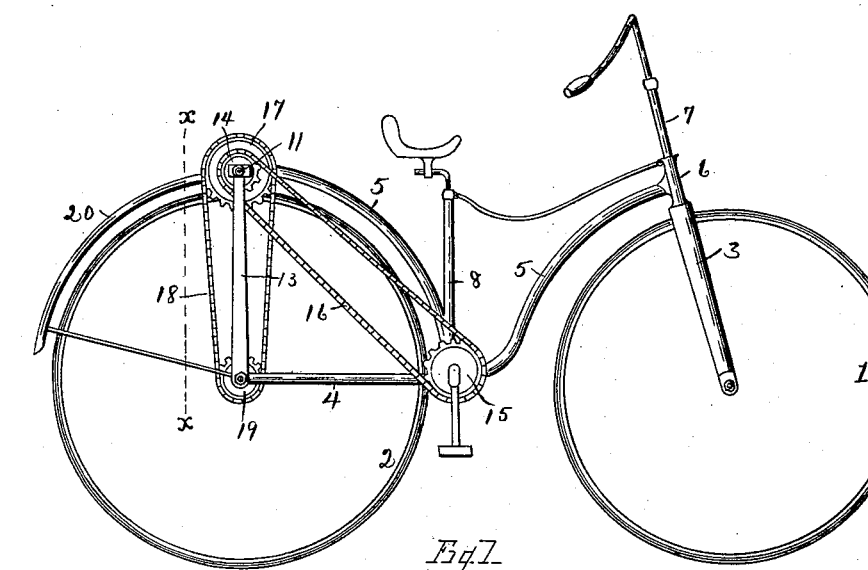
Figures 2, 3:
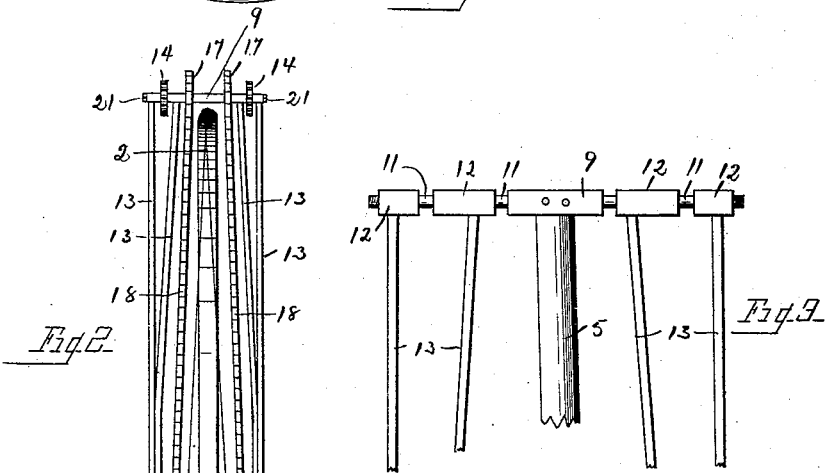
Figure 4:
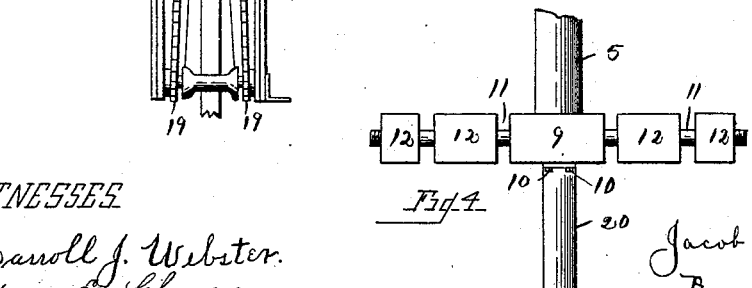

In the drawings, Figure 1 is a side elevation of a bicycle constructed in accordance with my invention. Fig. 2 is a rear view of the same on lines *x x*, Fig. 1, with the rear portion of the wheel removed in order to more fully disclose the driving-gear and braces for sustaining the upper transverse shaft and sprocket-wheels, the driving-wheel shaft and sprocket-wheels, and the drive-chains connected therewith. Fig. 3 is a like view with the sprocket-wheels and drive-chains removed from the transverse shaft, and also showing a section of the backbone of the frame connected with the casing in which the transverse shaft is journaled. Fig. 4 is a top plan view of the casing with the shaft journaled therein and showing the backbone and mud-guard connection with the casing.

1 designates the front and 2 the rear or driving wheel, respectively, the front wheel being journaled in the fork 3, as usual, and the rear or driving wheel 2 being journaled in the rear fork 4, which connects with the frame at the point where the crank-axle is journaled therein.

5 designates the backbone, having a steering-head 6, through which the fork-post 7 passes, from which point it curves downwardly to the point of attachment of the seat-post 8 and the rear fork, and thence curves upwardly concentric to the wheel-rim and is connected with a casing 9, preferably by means of bolts or rivets 10. Casing 9 is tubular throughout its length to receive a shaft 11, which is journaled therein at right angles to the wheel-tread. Shaft 11 is of substantially the same length of the axle of wheel 2 and is still further supported by sections of casing 12, in which it is journaled, the casing being held in place vertically by means of braces 13, secured upon the axle of wheel 2, and at their opposite ends to the casing, as shown in Figs. 2 and 3.

Upon shaft 11 there are secured two sprocket-wheels 14, there being sprocket-wheels 15 upon the crank-shaft, (one upon each side of the frame,) over which chain belts 16 pass and from thence to wheels 14, the wheels 14 being preferably of less diameter and having a less number of cogs than wheels 15, in order to increase the motion of shaft 11 from that of the crank-shaft.

17 designates sprocket-wheels, also secured upon shaft 11 and of a greater diameter than wheels 14, there being chain belts 18 passing over the same and sprocket-wheels 19 on the axle of wheel 2, wheels 19 being of less diameter than wheels 17, whereby an increase of speed is given wheel 2 over the speed of revolution of wheels 17.

It will be seen that I have provided a strong and durable support for shaft 11 and that by its position it is entirely out of the way of the rider, and that by my construction it is convenient to speed up to any desired velocity, it being only necessary to increase the size of one set of wheels or diminish the size of the other.

20 designates a section of mud-guard secured upon the rear side of casing 9 and extending over the upper rear portion of the wheel. I prefer to secure the braces and sections of casing closely together upon shaft 11 by means of nuts 21 upon each end thereof, in order to not only be enabled to take up any wear and prevent rattling of the parts, but to permit of withdrawal of the shaft to substitute gears of different sizes in order to increase or diminish the speed transmitted from the initial gears. By reason of gearing from each side of the wheel and frame there is given a much more steady movement than when geared upon one side and the strain upon the frame is greatly relieved.

While I have described a specific form of construction and arrangement of parts, I wish it understood that I may vary the same without departing from the spirit of my invention.

What I claim is—

In a bicycle, a frame comprising front and rear forks, respectively, a rigid backbone connected therewith and having a rear upwardly-curved portion, a casing secured thereto, having a shaft journaled therein, front and rear wheels journaled in the front and rear forks, respectively, braces extending vertically from the rear axle and having sections of casing secured thereto, in which the shaft is journaled, a crank-shaft journaled in the frame, drive-wheels upon the crank-shaft, rear axle and shaft journaled in the casings, and drive-belts connecting the rear axle and crank-shaft, respectively, with the shaft upon the frame by engaging with the drive-wheels thereon, the drive-wheels being of differential sizes to speed the rear wheel.

In testimony that I claim the foregoing as my own I hereby affix my signature in presence of two witnesses.

JACOB D. MOSKOWITZ.

Witnesses:
WILLIAM WEBSTER,
CARROLL J. WEBSTER.